Apr. 10, 1923.
D. F. HORMANN
1,451,393
HOMOGENIZING VALVE
Filed June 6, 1922
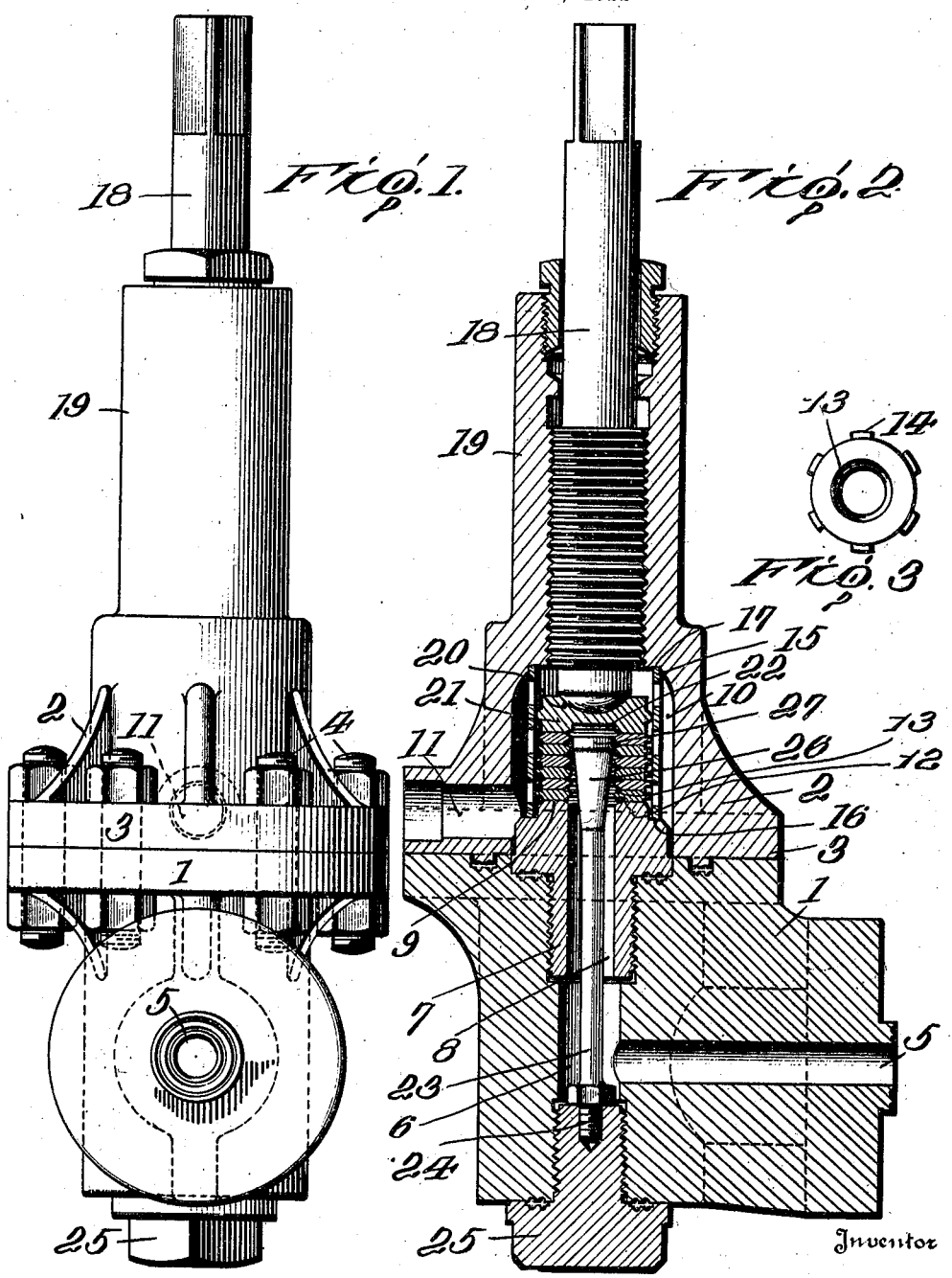
Inventor
D. F. HORMANN.
By
Sturtevant & Mason Attorneys Patented Apr. 10, 1923.

1,451,393

UNITED STATES PATENT OFFICE.

DIEDRICH FREDERICH HORMANN, OF OKLAHOMA, OKLAHOMA, ASSIGNOR OF ONE-HALF TO EDWARD FREEMAN COMEGYS, OF OKLAHOMA, OKLAHOMA.

HOMOGENIZING VALVE.

Application filed June 6, 1922. Serial No. 566,430.

*To all whom it may concern:*

Be it known that I, DIEDRICH F. HORMANN, a citizen of the United States, residing at Oklahoma, in the county of Oklahoma, State of Oklahoma, have invented certain new and useful Improvements in Homogenizing Valves, of which the following is a description, reference being had to the accompanying drawing and to the figures of reference marked thereon.

This invention relates to homogenizing valves for milk and other fluids, and more particularly to a homogenizing valve comprising a series or stack of homogenizing units adapted to form intervening homogenizing passages.

In homogenizing valves of the above character, the milk is forced under pressure, between the substantially flat contiguous faces of the homogenizing units, generally of the disk type. Experience has shown that the liquid invariably flows through the opening or space between the uppermost disks and not between any of the lower disks. This is due to the weight of the disks which is enough to cause the liquid to flow through the upper opening only when the apparatus begins to operate, and as the pressure is increased, the lower openings will more tightly close by the pressure on the upper disk, resulting in a very small quantity of liquid being pumped through the homogenizing valve. Obviously, the size of this upper opening cannot be enlarged beyond a certain maximum because a certain percentage of the liquid flowing therethrough will not be homogenized. Hence, attempts have been made to insure the flow of milk between all of the disks by providing their adjoining faces with radial slots, but experience has shown that these slots permit quite a percentage of liquid to flow through them without homogenization.

One of the objects of the present invention is to provide a homogenizing device wherein the milk or liquid may traverse between all of the homogenizing units, if necessary, without sacrificing any of the desired homogenizing effects.

Still another object of this invention is to provide a device of the above character which can be suitably adjusted so that the milk or other liquid will flow between the faces of one or more pairs of these homogenizing units corresponding to the amount of fluid pumped through the valve. In other words, the homogenizing valve will operate at variable capacity.

Still another object of the invention resides in the means for pressing the homogenizing units together and on to the seat therefor, this means being constructed and arranged to automatically adjust the valve disks so that there are no irregular openings between the same, even if they have not been correctly ground; or to compensate for any inaccuracy in the alinement of the valve stem with respect to the planes of the units.

Yet a further feature of this invention resides in the means for maintaining the homogenizing disks in their correct working position about the infeeding milk passage.

Further features of the invention relate to the special construction of the pressure pin for distributing the milk uniformly between the pairs of homogenizing units or disks, the adjustability of this pin and the special construction of the valve in general.

These and other features of the invention will be apparent from a perusal of the following specification taken in connection with the accompanying drawings, in which—

Figure 1 is a side elevation of the device;

Fig. 2 is a section taken at right angles thereto, and

Fig. 3 is a plan view of one of the homogenizing disks.

Referring now specifically to the drawings, the improved valve comprises a casing including a lower section 1 and an upper section 2. These sections are joined along the intermediate line 3, and are bolted together by a series of bolts 4, thereby providing a valve easily disassembled for cleaning purposes if desired. The lower section is provided with a liquid entrance 5 which extends transversely through one side thereof and terminates in a substantially vertical bore 6, the upper face of which is somewhat enlarged to receive a threaded plug 7 having a central milk passage 8 which constitutes a continuation of the passage 6. The upper face of this threaded plug 7 is suitably ground to provide a valve seat 9. The upper portion 2 of the valve casing is provided with an enlarged chamber 10 which surrounds the uppermost portion of the plug 7 and valve seat 9. This chamber 10 is of relatively large dimensions to accommodate the stack or series of homogenizing units which in the particular form illustrated are shown as disks which are superimposed upon the valve seat 9. These units may be made in any desired shape and assembled in other relations. At one side, the chamber 10 emerges into a milk discharging outlet 11 which passes through the lower side of the portion 2 of the casing.

The homogenizing disks are preferably arranged as annuli, the central openings of which register and are concentric with the milk passage 8 of the threaded plug 7. These annuli are preferably beveled on their inner faces as is customary in the art to provide an easy ingress of the milk between the ground flat surfaces of the annuli. Preferably the inner wall of each of these annuli of disks are beveled toward the flat face as at 12 and 13. On the upper circumference or periphery, each annuli is provided with a series of radial lugs 14 preferably sixty degrees apart. These lugs constitute spacing members for a perforated centering sleeve 15 which is clamped between the shoulder 16 on the upper face of the plug 7 and a shoulder 17 on the inner upper wall of the chamber 10. The inner wall of this centering sleeve fits exactly the outer peripheral faces of the lugs 14 so that when the disks are in position, the centering sleeve maintains them concentrically about the central milk passage 8. As shown, this sleeve is suitably perforated to permit the passage of the milk discharging therethrough. In addition, these perforations more thoroughly break up and emulsify the milk as it discharges therethrough.

The homogenizing disks are clamped together and to the seat 9 by means of a valve stem 18. This valve stem threads through an upper elongated sleeve 19 which is a part of the upper portion 2 of the valve casing. The lower portion of this valve stem 18 is provided with a rounded ball-like surface 20 which fits within a concavity in the top of the upper valve disk 21 which is preferably much thicker than the other valve disk and of course, has no opening therethrough, the same being slightly recessed as at 22 to permit a sufficient passage of milk to the joint between these disks and the lower adjacent valve disk. This ball joint between the valve stem 18 and the upper disk gives an automatic adjustment of the valve disk so that there can be no irregular openings between the disks, even if the same are not as thick on one side as they are on the other, provided that the faces of the disks are true and straight. So also, this universal or ball joint allows for any inaccuracy in the valve such as the center line of the valve stem or the threaded plug 7 not being exactly in line or parallel with the center line of the valve, or for instance, if the face of the threaded plug 7 is not exactly at right angles with the center line of the valve stem, which may be caused by inaccurate machining of the different parts of the valve. Obviously, this ball joint may be formed by inserting a round ball between the cup-shaped faces formed in the lower end of the valve stem 18 and the upper face of the top disk.

Means is provided for causing the liquid or milk to flow between all of the homogenizing disks. The preferred form of this means compresses the distributing or pressure pin 23 detachably carried as by means of a threaded connection 24 to a threaded plug 25 screwing into an extension of the liquid channel 6. This plug 25 not only closes the end of the bore 6, but also constitutes a means for adjusting the pressure pin relatively to the homogenizing disks. This pressure pin as illustrated extends longitudinally and centrally of the milk channel 6 and its inner end is provided with an enlarged tapered portion 26, the taper flaring gradually outward toward the upper end of the pin to a substantial shoulder 27, at which point the pin is of uniform diameter to the very end. The taper of this pin is so proportioned as to permit only such volume of milk or other liquid to flow between it and the inner projections of the annuli as can be accommodated by and efficiently homogenized between any two adjacent disks. If this pressure pin were not present, all of the milk or liquid to be unified would pass between the two uppermost disks irrespective of the quantity of liquid or milk going through the valve, but with the pressure pin 23 properly adjusted, the space between the pin and the inside edge of the next to the uppermost disk is restricted to such an extent as to allow only enough milk to get to the upper joint between the uppermost disk and the next adjacent disk which this joint will properly homogenize. Now, if more liquid or milk is pumped through the inlet 5 of the valve than this upper joint will perfectly homogenize, the pressure will be greater on the joint immediately below this, that is, the joint between the second and third disks, counting from the top downwardly, than on the upper joint before described, thus causing an increase of the gauge pressure of the pump. Then, if the valve stem 18 is adjusted, that is, slightly opened to give the proper working pressure, the second joint of the valve will open owing to the fact that all the milk or liquid pumped cannot pass the upper end of the pressure pin, and since the pressure and quantity of milk or liquid to be homogenized is increased, and the valve stem has been properly opened to give the corresponding correct working pressure, this second joint will efficiently homogenize the excess amount of fluid which cannot get through the uppermost joint but will flow through the next to the uppermost joint. Thus, by suitably adjusting the valve stem in accordance with the pump pressure and amount of fluid passing through the valve, each disk will open in turn until the full capacity of the valve is reached. From this it is evident that the valve can be operated at variable capacity and that the milk passing through the inlet passage 6 and coming in contact with the inside of the disks and the tapered portion of the pressure pin 23, is evenly distributed in a uniform manner to all of the disked openings.

It must be manifest that the above described device provides a valve which not only is capable of working at a variable capacity, but whenever so working it homogenizes the whole percentage of the milk passing therethrough. The valve as constructed and arranged also thoroughly insures the correct seating of the disks and their correct alinement with respect to the valve stem and pressure pin, the first, by means of the perforated sleeve 15, and the second, by means of the ball joint 19. It will also be evident that in the present valve, the upper portion 19 which may be called the bonnet or collecting dome, may be readily removed to facilitate the cleaning of the apparatus and for removing the homogenizing elements including the lower threaded plug or seat 7, as for instance, when it is necessary to remove these elements to regrind the same or for regrinding the seat. It is further manifest that the pressure pin is entirely independent of the homogenizing disks or annuli, and therefore, these elements can be disassembled without any danger of sticking.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A homogenizing valve comprising superimposed units having abutting plane faces adapted to homogenize liquid forced therebetween, means for adjusting the interval between two of such abutting faces, and means adjacent such abutting faces for restricting the flow of liquid to such interval.

2. A homogenizing valve comprising juxtaposed disks adapted to homogenize liquid forced therebetween, adjustable means for pressing said disks together and means irrespective of the pressure of the liquid for restricting the flow of liquid between two adjacent disks.

3. A homogenizing valve comprising juxtaposed disks adapted to homogenize liquid forced therebetween, and means independent of said disks for distributing the liquid uniformly in volume to the openings between said disks.

4. A homogenizing valve comprising juxtaposed annuli forming a central liquid passage and homogenizing passages between the faces of the annuli, and a tapered distributing pin concentrically disposed in said central liquid passage.

5. A homogenizing valve comprising juxtaposed annuli forming a central liquid passage and homogenizing passages between the faces of the annuli, a tapered distributing pin concentrically disposed in said central liquid passage, and means for adjusting the position of said pin relatively to said annuli.

6. A homogenizing valve comprising a casing having a suitable fluid passage therethrough, a stack of homogenizing annuli arranged with their central apertures concentric with said passage, a perforated centering sleeve surrounding said annuli, and constructed and arranged to maintain said annuli in centered position.

7. A homogenizing valve comprising homogenizing units, means for assembling said units in a series so as to provide a plurality of intervening homogenizing passages, and means for insuring the flow of equal volumes of liquid through said passages.

8. A homogenizing valve comprising a series of homogenizing units adapted to form intervening homogenizing passages, means whereby liquid may be forced under pressure to said units, and devices constructed and arranged to permit the separation of two, or more than two, of said units to permit a flow of liquid through the corresponding intervening passage or passages and to insure the equal spacing of said separated units when more than two are so separated.

9. A homogenizing valve comprising a series of homogenizing units adapted to form intervening homogenizing passages, means whereby liquid under pressure may be forced to said units, and devices constructed and arranged to permit the separation of two, or more than two, of said units under the pressure of said liquid to permit a flow of liquid through the corresponding intervening passage or passages and to insure the equal spacing of said separated units when more than two are so separated.

10. A homogenizing valve comprising a series of homogenizing units having contiguous homogenizing faces, means whereby liquid may be forced under pressure to said units, and devices constructed and arranged to cause the automatic equal separation of certain of said units due to the flow of said liquid.

11. A homogenizing valve comprising a series of homogenizing units having contiguous homogenizing faces, means forming a tapering fluid passage leading to said faces, and means for positioning said units to permit the flow of fluid therethrough.

12. A homogenizing valve comprising a series of homogenizing units having contiguous homogenizing faces, means forming a tapering fluid passage leading to said faces, and means for positioning said units to permit the separation of certain thereof due to the liquid flow.

13. A homogenizing valve comprising a body having a fluid passage therethrough, a disk seat adjustably threading into said body and provided with a bore registering with said passage, a stack of annuli seated on said disk seat, a stem threading into said body and pressing said annuli to said seat, a pin disposed in said fluid passage and provided with a tapering head and arranged concentrically within the bore of said annuli.

In testimony whereof, I affix my signature.

DIEDRICH FREDERICH HORMANN.